July 13, 1943.  H. WOCHNER  2,323,887
BRAKE TESTING MACHINE FOR MOTOR VEHICLES
Filed Nov. 8, 1940  7 Sheets-Sheet 1

July 13, 1943.     H. WOCHNER     2,323,887
BRAKE TESTING MACHINE FOR MOTOR VEHICLES
Filed Nov. 8, 1940     7 Sheets-Sheet 2

Inventor
Henry Wochner,
Walter N. Haskell
his Attorney

July 13, 1943. H. WOCHNER 2,323,887
BRAKE TESTING MACHINE FOR MOTOR VEHICLES
Filed Nov. 8, 1940 7 Sheets-Sheet 3

Inventor
Henry Wochner.
By Walter N. Haskell.
his Attorney

July 13, 1943.   H. WOCHNER   2,323,887
BRAKE TESTING MACHINE FOR MOTOR VEHICLES
Filed Nov. 8, 1940   7 Sheets-Sheet 4

Inventor
Henry Wochner,
By Walter N. Haskell,
his Attorney

July 13, 1943.  H. WOCHNER  2,323,887
BRAKE TESTING MACHINE FOR MOTOR VEHICLES
Filed Nov. 8, 1940  7 Sheets-Sheet 7

Inventor
HENRY WOCHNER
By Walter N. Haskell,
Attorney

Patented July 13, 1943

2,323,887

UNITED STATES PATENT OFFICE 2,323,887

BRAKE TESTING MACHINE FOR MOTOR VEHICLES

Henry Wochner, Rock Island, Ill.

Application November 8, 1940, Serial No. 364,863

7 Claims. (Cl. 73—51)

My invention has reference to a brake testing apparatus for motor vehicles, and aims to increase the efficiency and simplicity of machines of that type which are set forth in Letters Patent of the United States No. 2,171,283, issued to myself Aug. 29, 1939. As in said former patent, means for transmitting the force exerted by setting the brakes is of a mechanical character, arranged to show the relative braking capacity of either the front or rear pair of wheels, independently of the other pair, and provided further with hydraulic means for indicating the total combined force of both pairs of wheels.

Instruments of the kind mentioned are frequently positioned in a safety testing lane or station, along with other devices for determining the faults of automobiles, and as it usually happens that a number of cars are in line for making the tests, it is to be desired that the operation be completed as expeditiously as possible, so as to prevent congestion of the vehicles. The present invention is designed specially for use of this kind, with a minimum amount of delay in a line of cars desiring similar service. As a matter of practice, and in the making of regular tests of the braking conditions it has been found possible to drive as many as one hundred and thirty cars in a procession over the apparatus in an hour's time, and take the necessary readings, showing the condition of the brakes. This is on an average of more than two cars to the minute, and sufficiently speedy to keep an ordinary line of vehicles passing through a testing field on the move most of the time, without danger of being greatly hindered.

To bring about the desired ends, as mentioned above, the indicating means is actuated automatically by running a car upon the machine and setting the brakes. Independent indicating instruments are provided for each pair of wheels, and a third one of a hydraulic type to show the total pressure of all of the wheels, the readings on the several dials being retained, until such readings may be checked, following which the indicators are released, as pointed out herein. Means is provided for doing this manually, with the indicators manually released, and additional or coacting means whereby the releasing can be effected automatically by one of the wheels of the vehicle as it leaves the machine. It is usual to support the indicators, or gauges in a casing or tower at one side of the machine, and it is found to be desirable to provide duplicate indicating devices in both the front and rear walls, so that the readings can be checked either by those in the vehicle that is being tested or by those at one side of the same, and the present invention has been specially arranged for such a use, with additional means for effecting the release thereof by the mechanism above referred to, and simultaneously with the release of the first named gauges.

Another feature of the invention consists in the provision of control means for the hydraulic devices, to aid in regulating the pressure of the liquid in the system, and prevent any variations therein from expansion due to heat conditions, or contraction due to low temperatures, from being reflected in the gauges, so as to give a false reading therein.

The particular construction, arrangement, and manner of operation of the invention and its various parts, will more fully appear from the following specification, reference being had to the accompanying drawings, disclosing a preferred embodiment of the invention, in which;

Similar parts are indicated by corresponding reference characters throughout the several figures.

The invention embraces two pairs of tread plates A and B, and C and D, supported on ground plates as at E, with anti-friction rollers F separating the ground-plates and tread-plates. The last-named plates are suited to receive the two pairs of wheels of a motor vehicle, as the same is being brought to a stop by application of the brakes. The inner ends of one pair of tread-plates are spaced from the other pair, the spaces being filled by dummy plates G, one of which is removed in Fig. 1 to show some of the mechanical parts. The plates G are spaced from the tread-plates a sufficient distance to permit a limited movement of the tread-plates in a lengthwise direction, in response to the momentum of a vehicle thereon.

The inner ends of the tread-plates A and B are united by a bar 20, the ends of which are pivoted to connectors 21, as at b, secured to the corners of the tread-plates by welding or other suitable method. The bar 20 is pivotally connected with one end of a slide-frame 31, as at a. Fixed to the bar 20, on the inner side thereof is a connector 22, pivoted to the outer end of which is a rod or bar 23, extending inwardly through an opening in the lower part of a tower 24, supported at one side of the tracks, and provided with a cap plate 25. The purpose thereof will be more fully described hereinafter.

The rocking movement of the bar 20 on its pivot will cause a reciprocating movement of the rod 23 in one direction or the other, imparting the movement of such bar to the indicating devices, as later pointed out.

The relative movements of the tread-plates A and B are controlled by means of a pair of equalizer units 27, spaced from each other and fixed to the upper face of the bar 20. Some of the equalizer parts contact at their ends with abutments 28 formed by turning upwardly the ends of plates 29, which are fixed at their inner ends to the ends of a cross-bar 30, rigidly secured to a slide-frame 31. Said slide-frame is movable longitudinally of itself on a ground-plate H, filling the space between the wheel treads at a point midway their ends. At their other ends of the equalizer units are movable parts which contact abutments 32 at the inner ends of the plates 29, or with set-screws held in threaded openings therein as at 33.

Figures 1, 2, 18:
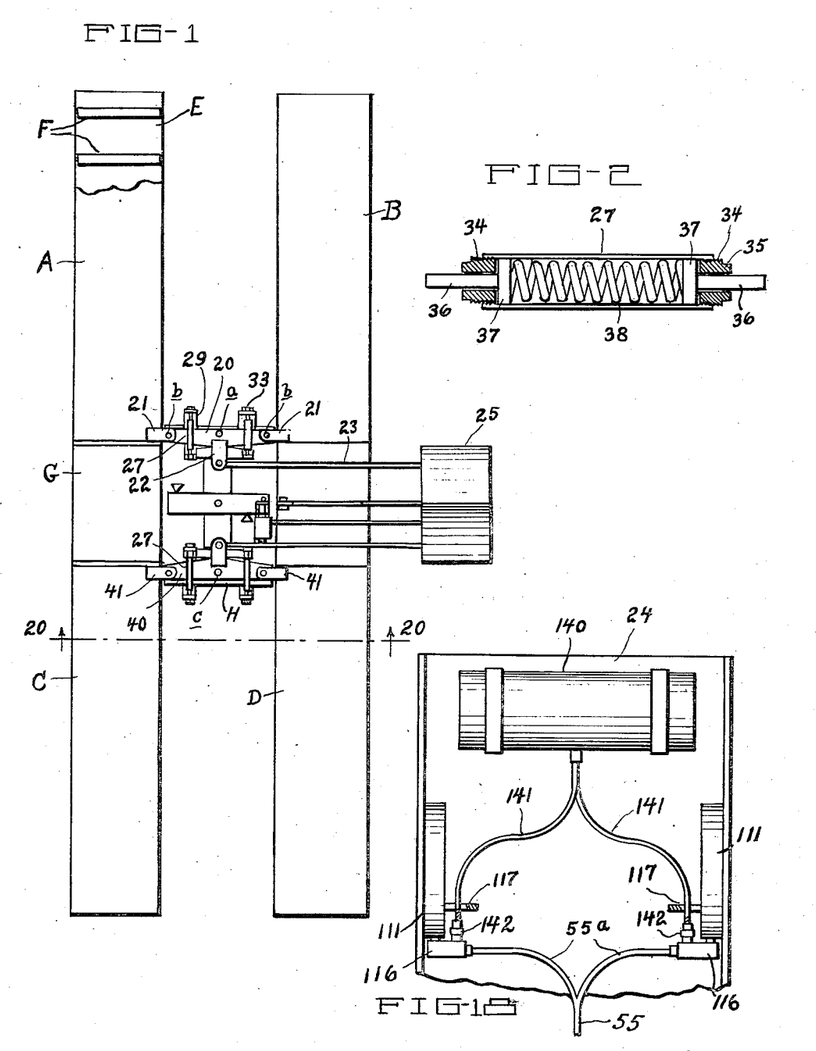
Fig. 1 is a plan view, showing a general layout of the invention.
Fig. 2 shows one of the equalizer springs and its mounting, with some of the parts in section.
Fig. 18 shows the hydraulic control devices, in detail, somewhat diagrammatic.
Figure 3:
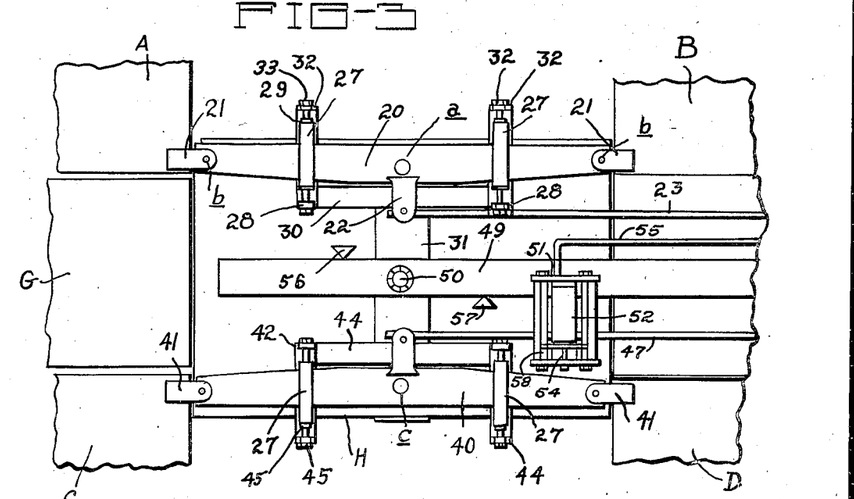
Fig. 3 is an enlarged detail of one of the mechanisms by means of which the brake testing force is imparted to the indicating gauges, in plan view.

Each of the cylinders 27 is threaded in its ends to receive similarly threaded plugs 34, provided at their outer ends with tool-holds for turning the plugs inwardly or outwardly in the cylinders. The plugs are also provided with openings 35 to receive the pins 36 of plungers 37, which bear against the ends of coiled springs 38, contained in said cylinders, and exerting an outward force. By the movement of the plugs 34 the tension of the springs can be varied, to suit the requirements of the equalizing operations. The ends of the pins 36 have a bearing against the abutments, but are free to move away therefrom if necessary, during the operation. The springs act in the manner of shock absorbers, or equalizers of force, and prevent irregular or erratic movement of the parts.

Having pivotal connections with the inner corners of the plates C and D is an equalizer bar 40, similar to the bar 20 in arrangement and operation, and having a pivotal connection with the slide-plate 31, near the end thereof opposite to the pivoting of the bar 20. Connected with the bar 40 is a pair of equalizer units 27, similar to those above described, and having similar pins 36 contacting abutments 42 on plates 43 fixed at their inner ends to a cross-bar 44 fixed to the slide-plate 31. The outer pins 36 contact set-screws in abutments 45 on the other ends of the plates 43. The bar 40 is also provided at a point midway its ends with a connector 46, to which is pivoted one end of a rod 47, extending into the lower part of the tower 24, for connection with indicating devices in said tower. The slide-frame 31 and cross-bars 30 and 44 comprise a rigid frame movable in one direction or the other in response to a corresponding action of the equalizer bars 20 and 40. This movement of the slide-frame and associated parts, which is in a direction length-wise of the machine, is of a free floating character, with a minimum of resistance or hindrance to the action thereof in response to the movement of the tread-plates, or any force applied thereto. It is unhampered by any attachments such as were shown in the earlier device shown in said former patent, which had a somewhat similar system, including a cross-bar which was anchored pivotally to a base-plate 12. This equalizer bar, also numbered 31, was cross-ways of the machine, and could rock on its pivot, but had no sliding action.

Figure 4:
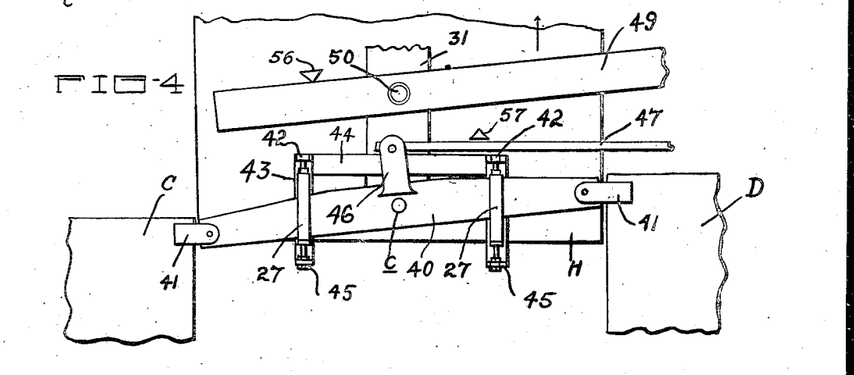
Fig. 4 is a similar view, with some of the parts shown responding to the braking force, somewhat exaggerated to better disclose the same.

Upon a pair of wheels being run upon one of the pairs of tread-plates, and the brakes applied, in case the force exerted on each wheel is the same, the relative positions of the plates will not change, but if the amount of force varies, one of each pair of tread-plates will be moved a greater distance than the other, as illustrated to an exaggerated degree in Fig. 4, in which the force is indicated as being applied to the plates C and D, in the direction shown by the arrow. This movement would be effected by the rear pair of wheels of a vehicle, in being run upon the plates, and the brakes set, stopping the vehicle. At the same time the forward pair of wheels would be exerting a stopping force upon the plates A and B. The arrangement is such that the vehicle can be run upon the plates in either direction, and the brakes tested.

As before mentioned, any movement of the bars 20 and 40 is imparted to the slide-frame 31, and pivoted to said plate at a central point is a cross-arm 49, one end of which has a connection with the frame 51 of a hydraulic cylinder 52, supported on the cross-plate H. The cylinder is provided with a piston, (not shown) and rod 54 therefor, which rod is connected with the frame 51, and is moved by the rocking action of the arm 49, to cause a compression in the cylinder 52. The compressed charge is effective through a tube 55 with a casing or casings in the tower 24 for operation of indicating devices associated therewith. Springs 58 hold the frame 51 normally in extended position, and aid in returning the plates beneath the vehicle wheels to their former positions as soon as the vehicle stops.

Positioned on the plate H is a pair of triangular stops 56 and 57, on opposite sides of the pivot 50, with which stops the arm 49 is adapted to come in contact, on its opposite edges. In a movement of the slide-frame 31 in the direction shown by the arrow in Fig. 4, one end of the arm is held by the stop 56, and the arm rocks upon the pivot 50, carrying the other end in the direction indicated, and causing the cylinder 52 to operate. If the movement of the plate 31 is in the opposite direction the arm 49 comes in contact with the stop 57, and the arm 49 is again rocked as the movement continues, and with rotation on the pivot in the same direction as before, so that the cylinder piston is moved in the same direction again, compressing another charge of the liquid.

One of the faces of the tower 24 fronts in the direction of the tread-plates, and in the upper part thereof (Fig. 5) is a pair of openings in which is positioned dial frames 60 and 61, supporting dials 62 and 63, each of which is provided with a scale having graduated markings, as indicated at 64. Said scales start at the top with zero, and increase in value in each direction to the bottom. Each of the dials also has an indicator arm 65, fixed on a shaft 66, supported centrally of the dial. On the inside of the dial is secured to the shaft a gear pinion 67 (Figs. 9 and 10), in mesh with the teeth of a gear rack 68, slidable against one edge of a bed-plate 69, and held in place by a cover plate 70 fixed to the bed-plate, as by screws 71.

The mechanisms just described, and other parts which assist in the operation of the indicators, are similar, except that those of one of the dials are reversed in position from those of the other one, but the same numbers are made use of in referring to both of said mechanisms.

The bed-plate 69 is channeled for the passage of a vertical bar 73, parallel with the rack 68, and connected therewith by means of arms 74, rigidly connected with the rack, and engaged at their other ends with notches 75 in the bar 73. The bed-plate 69 is also recessed to accommodate a lock-bar 76, provided at its upper end with ratchet-teeth 77, engageable with a series of similar teeth 78 on the edge of the bar 73, at its upper end. At its lower end the bar 76 is provided with ratchet-teeth 79, for engagement with similar teeth 80 on the edge of the bar 73, at its lower end. The arrangement of the teeth is such that as the bar 73 is moved upwardly the teeth 79 and 80 will interlock, preventing a return movement of the bar 73 downwardly. In the same manner, if said bar is moved downwardly the teeth 77 and 78 engage, locking the bar from return movement upwardly. This operates to hold the indicator 65 in shifted position until the reading on the dial has been checked.

The ends of the bar 76 are concealed by extensions 81 and 82 of the plate 69, the ends of said extensions being turned inwardly to form stops for the ends of said bar. Pivoted to the outer face of the plate 70, as at h, is a plate 85, from which a pin 86 is projected inwardly into the space between the bars 73 and 76, and upon the plate being rocked upon its pivot the pin 86 is instrumental in forcing the bar 76 away from the bar 73, to disengage one or other of the ratchet-tooth mechanisms, in case they are engaged. The bar 76 is held in yieldable engagement with the bar 73 by means of a coiled spring 83 in a recess in a boss 84 on the plate 69. The rocking of the plate 85 is accomplished by means of an arm 87, with which is connected a rod or wire 88, for operation from below, as hereinafter described. The arm 87 is held normally in elevated position by a coiled spring 89 (Fig. 13), connected with said arm at its lower end, and at its upper end to a fixture in the tower casing.

Figures 9, 10, 11, 19:
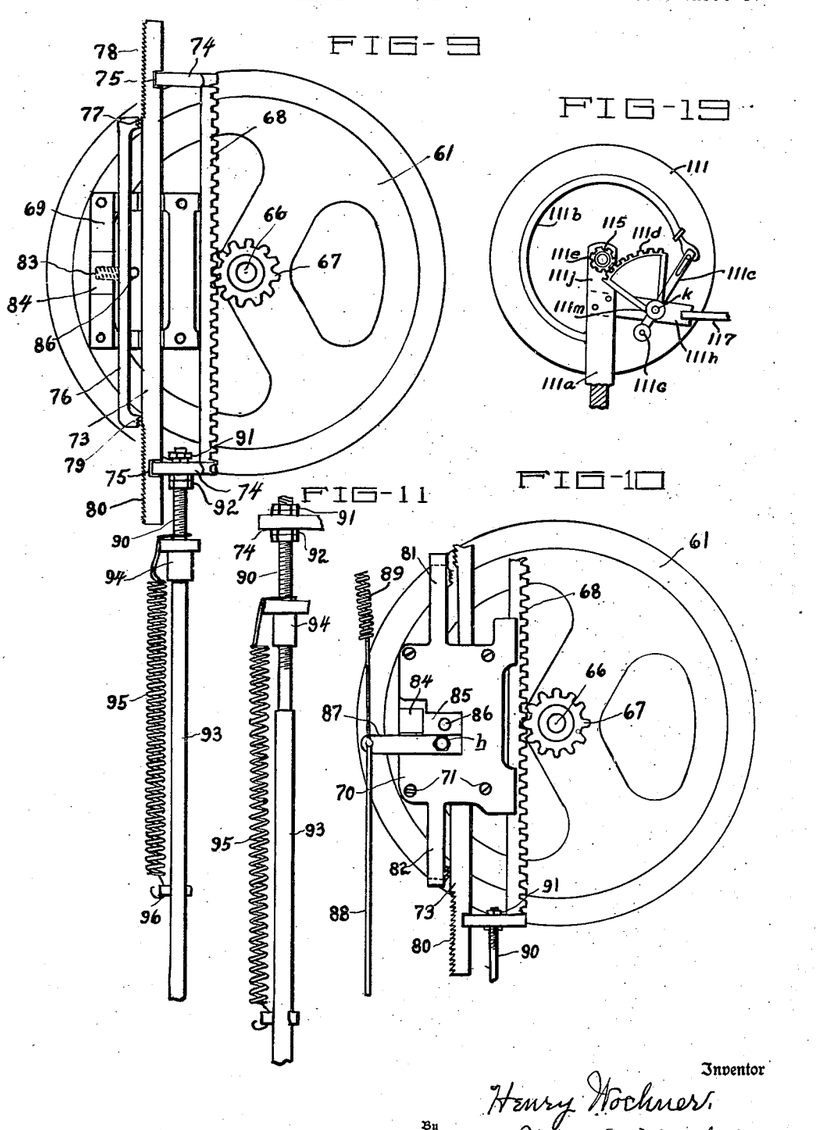
Fig. 9 shows the rear of one of the gauge mountings, and operating devices therefor, with the plate 70 removed.
Fig. 10 is a similar view with the plate in position.
Fig. 11 is a detail of the upper part of the tube 93.
Fig. 19 is a detail of the control mechanism for the indicators 114.

The indicators 65 are actuated by the following means: The lower arm 74 is perforated to receive the upper end of a rod 90, threaded at its upper end, and provided with a nut 91 above the arm, and a nut 92 below the same, with possibilities of adjustment of the positions of said nuts, to hold the rod at a higher or lower point, as desired. The lower end of the rod 90 is held telescopically in the end of a tubular rod 93, the threaded part of the rod 90 being also provided with a turn nut 94, with which the upper end of the rod 93 contacts. (Fig. 9.) The rods 90 and 93 are held yieldably in telescoped relation by a spring 95, connected at its upper end with the rod 90, and at its lower end to a pin 96 in the rod 93. In the lower end of the rod 93 is held telescopically a rod 97, (Fig. 8) the lower end of which is pivoted to the long end of a bell-crank lever 98, pivoted in supports 99 on the plate 100. Connected with the short end of said lever is the end of the rod 23, leading from the equalizer bar 20, and a similar mechanism is provided in the lower end of the tower 24 for the rod 47 from the bar 40, with similar connections to the indicator devices at 61, and not separately shown herein. Upon a movement of the rod 23 the lever 98 is rocked, causing an upward or downward movement of the rod 93, in one direction or the other, with a corresponding movement of the indicating arm on the dial associated therewith.

Fixed to the lower end of the rod 93 is an arm 101, having an angular end portion for the passage of the rod 97, the downward movement of said rod being arrested by a nut 102 on said rod. A coiled spring 103 is interposed between the angle of the arm 101 and a fixture 104 at the lower end of the rod, which holes the angle yieldably in contact with the nut 102. In case the long end of the lever 98 is moved downwardly the rod 93 and rack 68 are moved in the same direction, causing the force of the movement to be recorded on the gauge. If the arm 98 is rocked upwardly the rod 93 and rack 68 move in the same direction, recording the movement on the opposite side of the dial. In the first-named movement, as soon as the indicator hand is set the tread plates return to neutral position, without disturbing the position of the indicator. This is by reason of the teeth at the upper end of the bar 73 being engaged, and the bar locked in position. The rod 97 then moves upwardly independently of the rod 93, which is returned to its original position upon the release of the bar 73. The return of the tread-plates to neutral position is impelled by the force of the liquid in the hydraulic system, aided by the force of the springs 58 of the hydraulic cylinder.

In case the rocking movement of the arm 98 is upwardly, the rack 68 and bar 73 are moved upwardly by the rod 93, actuating the indicator hand in the opposite direction, and causing the teeth at the lower end of the bar to engage with the teeth 79. As the parts come to a rest the tread-plates return to neutral again, the tubular part 93 of the rod moving downwardly, as indicated in Fig. 11, with the bar still locked, and the reading on the gauge retained. Upon the release of the bar 73 the rack and bar return to a neutral location, as shown in Fig. 9.

In using the gauges 61 and 62, in the upper part of the tower, one of said gauges indicates the relative braking pressure of the front pair of wheels, and the other one the relative pressure of the rear pair, in positions corresponding with the positions in which the wheels stand on the tread-plates, and depending upon the direction in which the vehicle is heading. The operation of the apparatus is of a reversible character, so that the car can be driven on from either direction. If the pointer on the gauge moves in the same direction as the vehicle, it shows that the wheel nearest the tower is showing greater stress than that of the opposite wheel on the same axle, and corrections can be made accordingly. Should the indicator move in the opposite direction, or towards the rear of the vehicle, it shows that the wheel farthest from the tower is exerting the greater amount of force. The reading indicates how much the braking effort of one pair of wheels exceeds that of the other pair, and if the force is equal there is of course no movement of the indicator.

Figure 13:
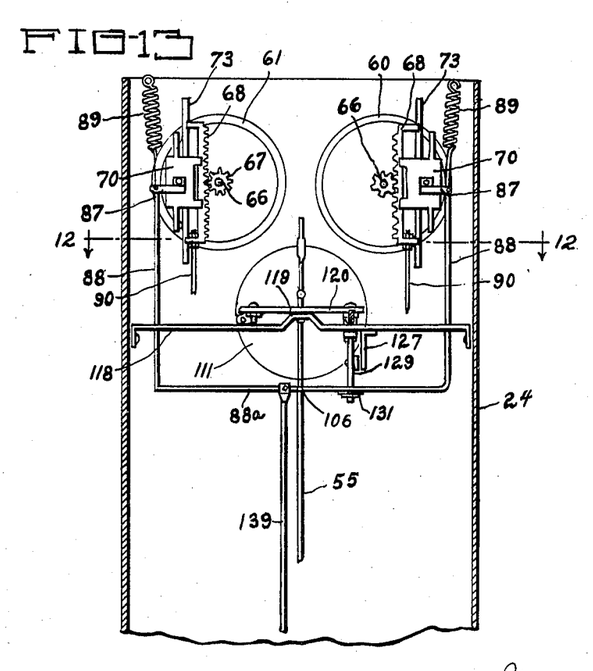
Fig. 13 is a fragmentary vertical section of the tower 24, looking toward the front wall thereof.

As shown in Fig. 13, each of the indicator mechanisms is provided with a release rod 88, and the two rods are united at their lower ends by a cross-rod 88a, from which a pin 106 projects outwardly through a slot 107 in the wall of the tower 24, and is provided on the outside of the casing with a knob 108. By pushing said knob downwardly the bars 73 are simultaneously released, and the indicators return to neutral position, ready for another test.

Figure 14:
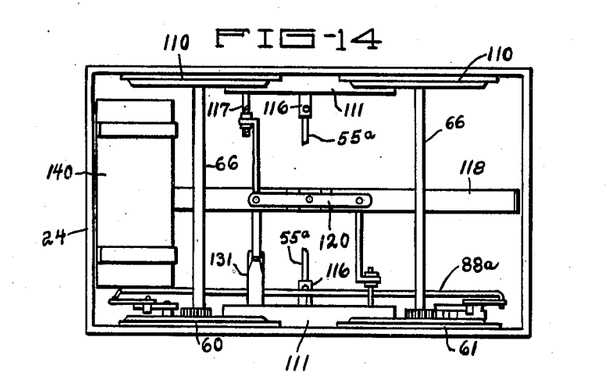
Fig. 14 is a plan view of the top of tower 24, with the cap 25 removed.

It has been found to be desirable to provide both faces of the tower with indicating devices, so that identical readings can be had simultaneously from opposite sides thereof. An arrangement of this kind is shown in Fig. 14, wherein additional frames 110 are secured at openings in the opposite side of the tower, which are also provided with dials and indicating pointers, not shown. These pointers, however, are secured to the ends of the shafts 66, and turn therewith, and the operation of such indicators is controlled by the actions of said shafts, and corresponds with that of the indicators first described. Upon the release of the mechanism before pointed out, the return movement of the shafts 66 is imparted to the indicators in the frames at 110, so that no additional devices for locking and releasing the same are required.

Figures 5, 6, 7, 8:
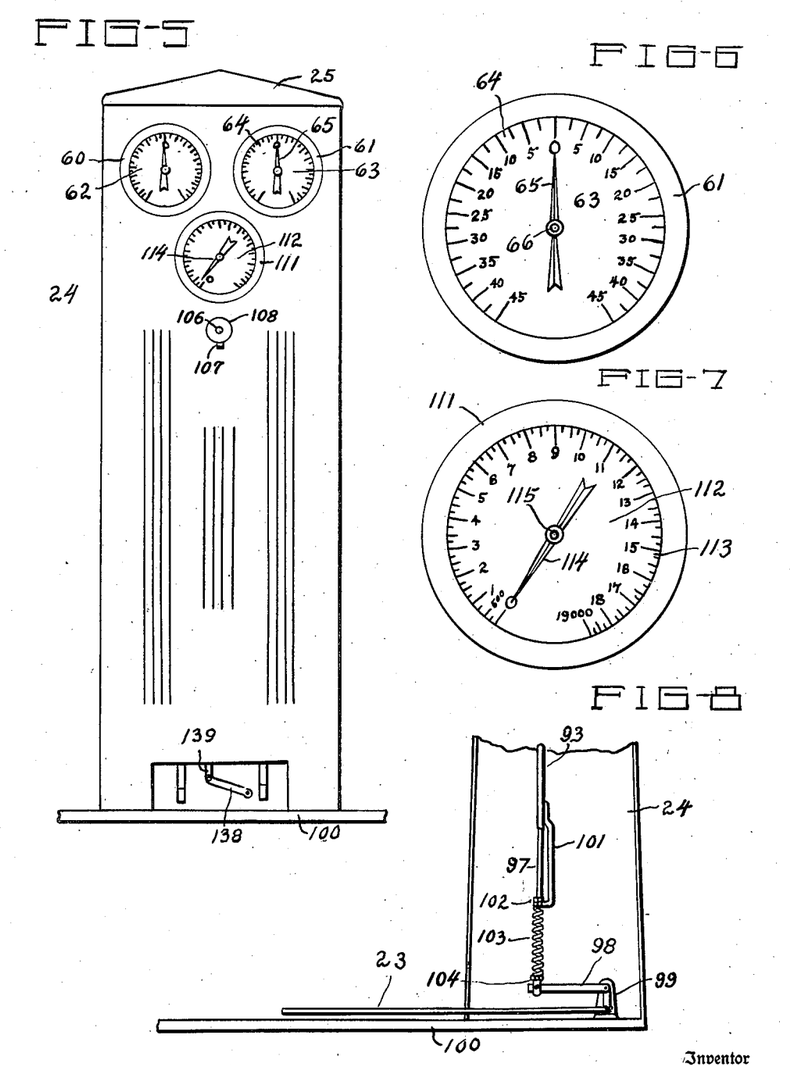
Fig. 5, shows one face of the indicator tower in elevation.
Fig. 6 is a detail of the gauge 63, detached.
Fig. 7 is a similar view of the gauge 112.
Fig. 8 is a detail of mechanism at the lower part of the tower.

In order to make it possible to determine the total number of pounds of braking effort, an additional indicating apparatus of a hydraulic character is provided. This is also of a dual type, with casings or drums 111 installed at openings in the front and rear walls of the tower 24, at a point a little lower than the other gauges. (Fig. 13.) As shown in Figs. 5 and 7 each of said frames contains a dial 112, with markings of 113 progressing from zero to any desired number, and indicating a pressure of one thousand pounds, and multiples thereof. Each indicator is fitted with a pointer 114, fixed on a shaft 115, which is under the control of devices in the casing 111, of a common type, for use by hydraulic pressure, one such arrangement being shown in Fig. 19. In said figure the casing 111 is indicated, with one of its sides removed, and at the lower part of said casing is a pipe 111a, for the passage of the hydraulic element upwardly into the casing. Connected with said pipe is a flat coil 111b, which tends to straighten out from the force within, and rock an arm 111c pivoted on a support 111g. The arm is also connected with a sector gear rack 111d, the teeth of which are in mesh with those of a pinion 111e on the shaft 115, from which the indicator 114 gets its movement. A spring plate 111h is fixed at one end to a support 111j above the pipe 111a, and exerts a frictional force against a disk 111m at the pivot point of the gear sector. As the gear sector is rocked downwardly it is held in its shifted position by the plate 111h, until released by the pin 117, engaging the plate 111h at a slight angle therewith, and moving it away from the disk. For operating purposes the casings 111 are provided with feed casings 116, attached to the casings 111 and communicating therewith, and connected by tubes 55a with the main tube 55, leading from the cylinder 52. By the action of said cylinder the force of the fluid in the system is imparted in both casings 111 simultaneously, and also coincidently with the operation of the mechanical gauges before described. The operation of the hydraulic liquid is under the control of other mechanism, which will be pointed out later.

Figure 12:
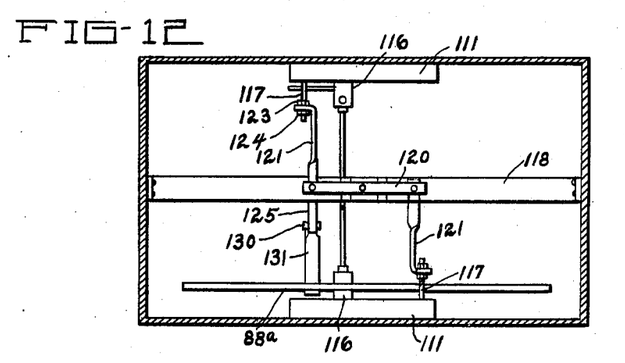
Fig. 12 is a cross-section on the line 12—12 of Fig. 13 with projecting portions of the indicators 60 and 61 omitted.

Each of the casings 111 is provided with a release means, such as a pin 117 extending into the same, and by the action of which the force can be released, in connection with the internal devices above referred to. This will permit the indicator hands 114 to return to normal position, as in Fig. 7. A special mechanism for the simultaneous operation of said release pins is provided, as follows: Secured at its ends in the end plates of the tower 24 is a supporting bar 118, in the middle part of which is a flattened arch 119, upon which is pivoted an arm 120, to swing horizontally. One end of said arm is connected with one of the pins 117 by a rod 121, bent at its end, and perforated to receive the end of the pin, which is threaded and fitted on opposite sides of the rod end with nuts 123 and 124 (Fig. 12). The other end of the arm 120 is similarly connected with the other pin 117. By means of the threaded connections relative adjustments of the pins and rods can be made.

Figures 15, 16:
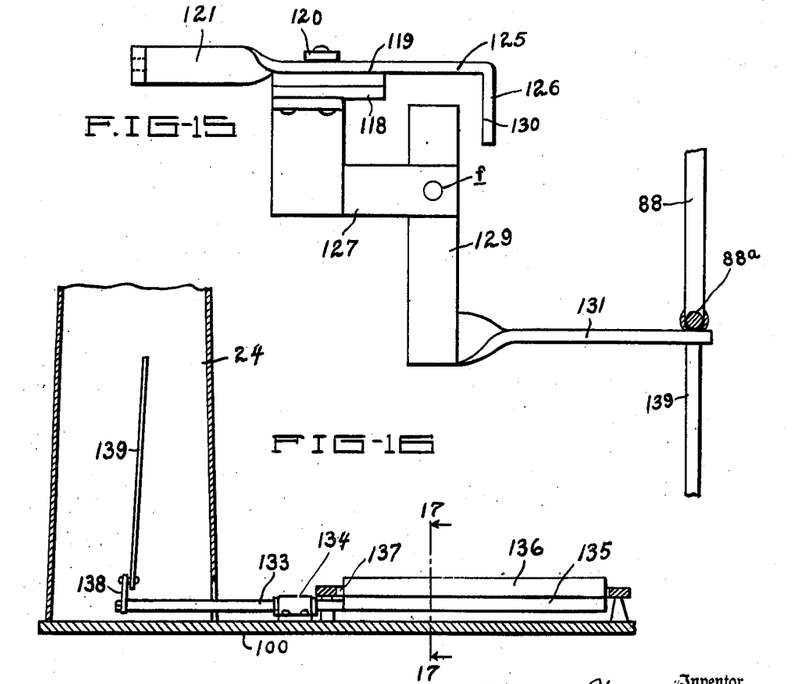
Fig. 15 is a detail of the hydraulic gauge release devices, for releasing all of the gauges simultaneously.
Fig. 16 is a detail of the trip mechanism, for operation by one of the vehicle wheels.

The first-named rod 121 is projected into an arm 125, with a downwardly turned end 126, (Figs. 14 and 15) and fixed to the lower side of the bar 118 is an angle-plate 127, to the end of which is pivoted at f a frame piece 129, to the upper end of which is fixed a cross-head 130, contacting the inner end of the end piece 126. Fixed to the lower end of the piece 129 is a plate 131, turned with its flat side upwardly, and projecting beneath the cross-rod 88a. When the cross-rod is moved downwardly by means of the knob 108 the piece 129 is rocked, with the cross-head 130 moving the arm 125 and rod 121 in a direction to release the force in one of the casings 111. At the same time the arm 120 is rocked on its pivot, causing the other rod 121 to actuate the release pin 117 to which it is attached, releasing the pressure in the other casing. The hydraulic casings are thus both relieved at the same time, and coincidentally with the return of the other gauges to neutral.

Figure 17:
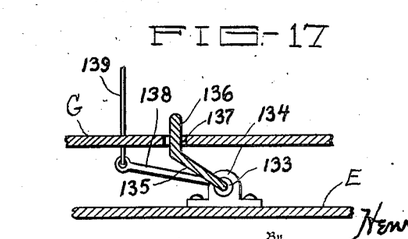
Fig. 17 is a cross-section on the broken line 17—17 of Fig. 16.
Figure 20:
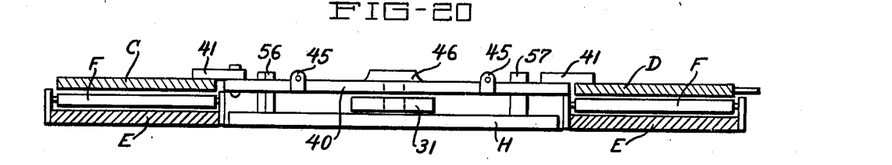
Fig. 20 is a cross-section on the broken line 20—20 of Fig. 1.
Figure 21:
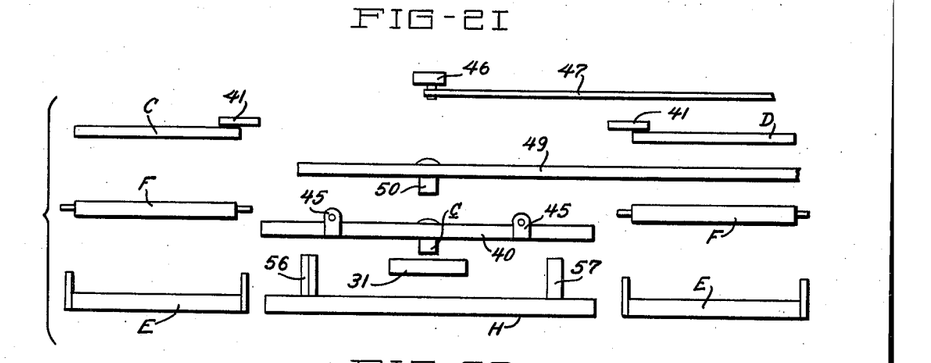
Fig. 21 is similar to Fig. 20, with the parts in exploded position.
Figure 22:
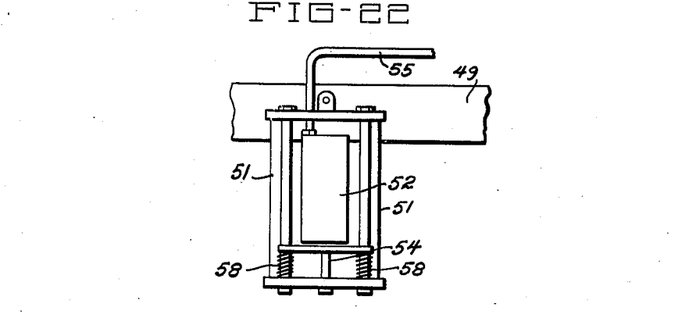
Fig. 22 is an enlarged detail of the hydraulic motor 52.

Means is also provided for the instant and coincident release of all of the indicators, by the operation of one of the wheels of a vehicle being tested, which consists of a shaft 133, rockingly supported in a bearing 134 on the plate 100 forming a lateral extension of the plate H (Figs. 16 and 17) and connected at one end with a trip plate 135, having a vertically disposed blade 136 projected upwardly through a slot 137 in one of the dummy plates G over which the wheels of a car travel, so that the blade will protrude a little above the plate. Fixed to the other end of the shaft 133 is an arm 138, with which is connected a cord or wire 139, extending upwardly in the tower 24 to an attachment with the cross-rod 88a. As a car is driven from the machine one of the wheels passes over the blade 136, forcing it downwardly, and rocking the arm 138, to release all of the gauges simultaneously, similarly to the operation of the knob 108.

It will be obvious that it is a simple matter to drive a vehicle upon the tread-plates, set the brakes, check up on the indicators, and drive off again, setting the machine for the next test.

In the use of the hydraulic system for operating the gauges 112, there is danger of the action of the liquid being interfered with by high temperatures, causing an expansion of the liquid, which will be reflected on the indicating devices, or of low temperatures, tending to cause a vacuum in the recording apparatus. In either case there is a possibility of the indicator hand being moved to one side or the other, sufficiently to cause a false reading when the test is being made. To prevent this an extra supply of the hydraulic liquid is stored in a small tank 140, supported near the upper end of the tower 24, at one side thereof. (See Fig. 18.) Tubes 141 connect said tank with the feed casings 116, the lower ends of said tubes being provided with check valves 142, which are inactive at such times as the apparatus is idle, but which close automatically when pressure is exerted by the cylinder 52. The tank 140 is partially filled with the liquid under normal pressure, which tends to keep the system operating under uniform force at all times, without interfering therewith when its help is not required. If there is danger of a vacuum in the indicating mechanism the liquid in the tank makes up the deficiency.

It will be obvious that changes can be made in the form and arrangement of the various parts of the invention without departing from the purpose and scope thereof, as set forth herein.

What I claim, and desire to secure, is:

1. In a brake testing machine, a casing, a gauge mounted therein provided with a rotatable shaft and pointer thereon, gearing in said casing operatively connected with said shaft, including a slidable bar having ratchet teeth thereon at both ends, a lock-bar having teeth at both ends engageable with said ratchet teeth, to lock the slidable bar at either end of its movement, a release lever for said lock bar, means for imparting a reciprocating movement to said slidable bar, and means for actuating said release lever.

2. In a brake testing machine, a casing, a gauge mounted therein provided with a rotatable shaft and pointer thereon, gearing in said casing operatively connected with said shaft, including a slidable bar having ratchet teeth thereon, a lock-bar having teeth engageable with said ratchet teeth to lock the slidable bar at the end of its movement, a release for said lock bar, and means for operating the same, a rod connecting said slidable bar in a downward direction, and formed of telescoping parts, and a spring uniting said telescoping parts, and permitting the movement of one of said parts independently of the other.

3. In a brake testing machine embracing movable tread-plates to receive the wheels of a motor vehicle, and equalizer bars connecting the same in pairs, an indicating device operatively connected with one of said bars, including a connecting rod provided at both of its ends with telescopic parts, springs for yieldable connection of such parts, mechanism for operation of the indicating device, including means for locking the same in indicating position, operable by said rod, and means for the release of said locking means.

4. In a brake testing machine, a supporting frame, two pairs of tread-plates mounted on said frame for limited lengthwise movement, a pair of equalizing bars connected with said pairs of plates at their inner ends, one for each pair, a slide-frame on said supporting frame, operatively connected with said bars, a tower at the side of said tread-plates, indicating devices in said tower, connections between said indicating devices and said bars, to actuate said devices, a cross-arm on said slide-frame, a hydraulic cylinder on said supporting frame, operatively connected with said cross-arm, hydraulic indicating devices in said tower, and connections between said cylinder and the last-named indicating devices to give movement thereto.

5. A brake testing machine, comprising a ground frame, two pairs of tread plates supported on said frame, for a limited lengthwise movement, and adapted for the support of the front and rear wheels of a motor vehicle, bars having a pivotal mounting above said ground-frame, connecting said pairs of tread-plates at the inner ends thereof, one for each pair, a slide-frame on said ground frame, operatively connected with said bars, a tower at the side of said tread-plates, indicating devices in said tower, connections between the indicating devices and said bars, a cross-arm pivoted on said slide-frame, and means for limiting the movement thereof mounted on the ground-frame, a hydraulic cylinder on said ground frame, in proximity to one end of said cross-arm, and operatively connected therewith, hydraulic indicating devices in opposite sides of said tower, connections between said last-named indicating devices and said hydraulic cylinder, and means for releasing the last-named indicating devices.

6. A brake testing machine, comprising a ground frame, two pairs of tread-plates mounted on said frame for limited movement lengthwise, and adapted to receive the front and rear wheels of a motor-vehicle simultaneously, equalizer bars connected with said pairs of tread-plates, a tower in proximity to said tread-plates, having a central space of rectangular form in cross-section, shafts in said space transversely thereof, indicating devices at the ends of said shafts in opposite walls of the tower, including indicating pointers connected with said shafts, gearing connected with each of said shafts at one end thereof, means for actuating said gearing to cause a simultaneous action of the indicators, means for locking said indicators at the end of the indicating movements, means for simultaneously releasing said indicators, and connections between said gearing actuating means and said equalizer bars, to impart the movement of the bars thereto.

7. In a brake-testing machine, a ground-frame, two pairs of tread-plates supported on said ground-frame for a limited movement lengthwise, and adapted for the support of the wheels of an automobile, equalizing bars mounted above said ground-frame for horizontal movement, and pivotally connected with said tread-plates, one for each pair, a slide-frame on said ground-frame operatively connected with said equalizer bars to move in the same direction as said bars, a cross-arm pivoted to said slide-frame, limiting devices on said ground-frame engageable with said cross-arm to compel the movement of the cross-arm in either direction coincidently with the movement of the equalizer bars in one direction or the other, a hydraulic cylinder supported on said ground-frame, and operatively connected with said cross-arm, a tower adjacent to said ground-frame, gauge devices in said tower, including an indicating arm and shaft therefor and a scale for use with said indicating arm, a hydraulic apparatus in said tower connected with said shaft to operate the same and said indicating arm, and connections between said last-named apparatus and said hydraulic cylinder, to receive power therefrom, for imparting to the gauge devices the relative braking stress of wheels supported on the tread-plates.

HENRY WOCHNER.